(12) United States Patent
Scranton et al.

(10) Patent No.: US 6,962,473 B2
(45) Date of Patent: Nov. 8, 2005

(54) APPARATUS FOR TRANSFERRING CONTAINERS AND FLAT RACKS FROM A TRUCK TO A TRAILER

(75) Inventors: Tom L. Scranton, Gresham, OR (US); Todd H. Terp, Yamhill, OR (US); Kenneth R. Leaf, Sandy, OR (US); Raymond Clyde Barney, Gresham, OR (US); Joseph S. Kelchner, Troutdale, OR (US)

(73) Assignee: Columbia Body Manufacturing Co., Clackamas, OR (US)

( * ) Notice: Subject to any disclaimer, the term of this patent is extended or adjusted under 35 U.S.C. 154(b) by 135 days.

(21) Appl. No.: 10/360,606

(22) Filed: Feb. 6, 2003

(65) Prior Publication Data

US 2004/0156701 A1    Aug. 12, 2004

(51) Int. Cl.[7] .................................................. B60P 1/00
(52) U.S. Cl. ...................................... 414/475; 414/499
(58) Field of Search ............................... 414/498–500, 414/475

(56) References Cited

U.S. PATENT DOCUMENTS 3,163,306 A * 12/1964 Bennett et al. ............. 414/498
4,836,735 A *  6/1989 Dennehy et al. ............ 414/475
5,507,514 A *  4/1996 Jacques .................... 280/407.1
6,106,209 A *  8/2000 Krenek ...................... 414/24.5
6,126,378 A * 10/2000 Landoll et al. ............. 414/494
6,726,431 B2 * 4/2004 Morrell ...................... 414/340

* cited by examiner

*Primary Examiner*—Thomas J. Brahan
(74) *Attorney, Agent, or Firm*—Chernoff, Vilhauer, McClung & Stenzel, LLP

(57) ABSTRACT

A system for loading cargo containers and flat racks off of a truck having a hook lift system onto a trailer and from the trailer back onto the truck comprising a carriage that is moveable along a track system that runs the length of the trailer. The carriage includes a cradle that a cross member located at the lower rear edge of the container on which it fits so that the carriage supports the rear portion of the container as it travels rearwardly along the trailer. The cradle includes side positioning blocks which center the container on the trailer as it is being placed in the cradle. Also located on the carriage is a receptacle which receives wheels located at the lower rear edge of flat racks. A carriage return mechanism urges the carriage forwardly as it approaches the front of the trailer. Locks at the front and rear of the trailer secure the container to the trailer.

20 Claims, 14 Drawing Sheets

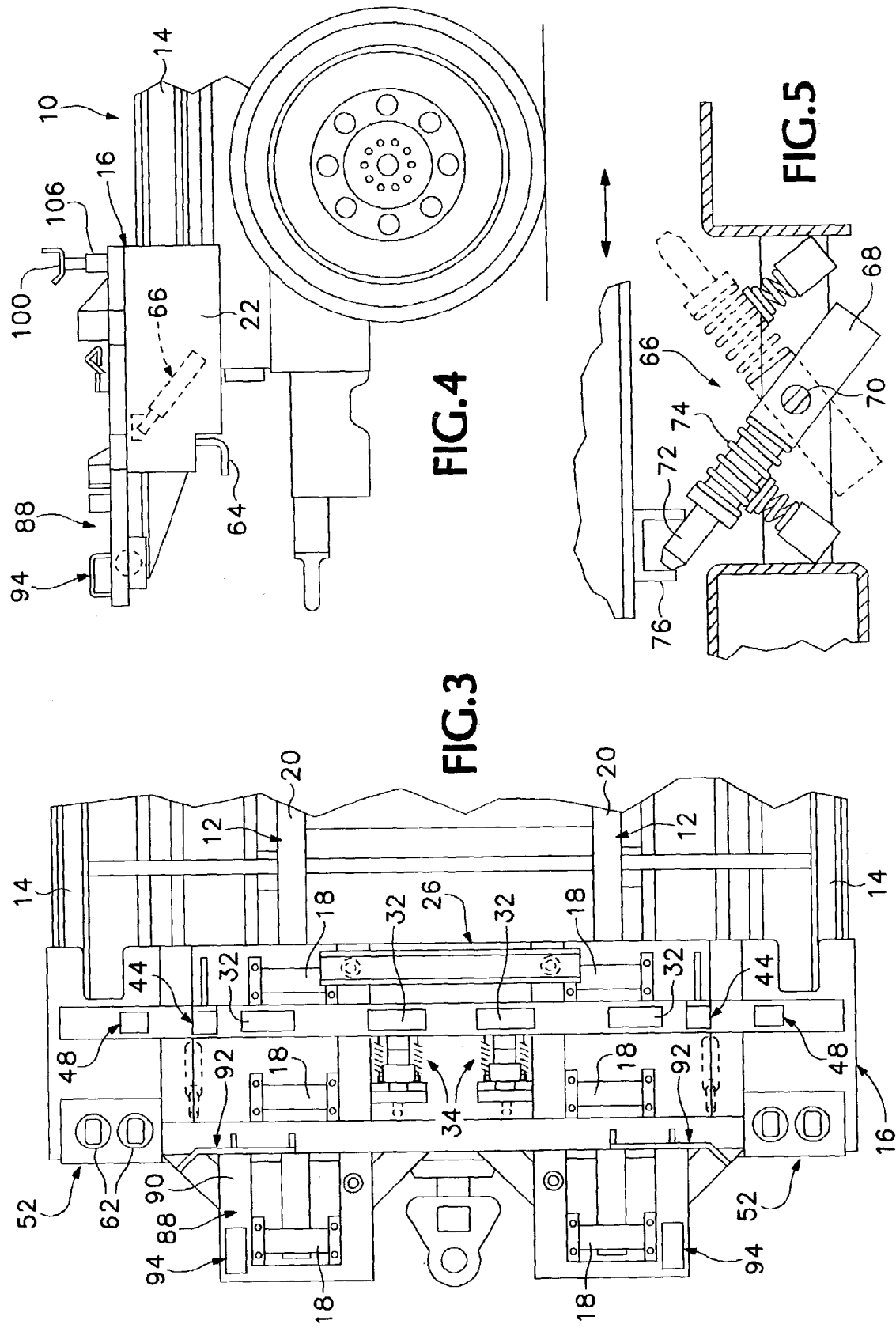

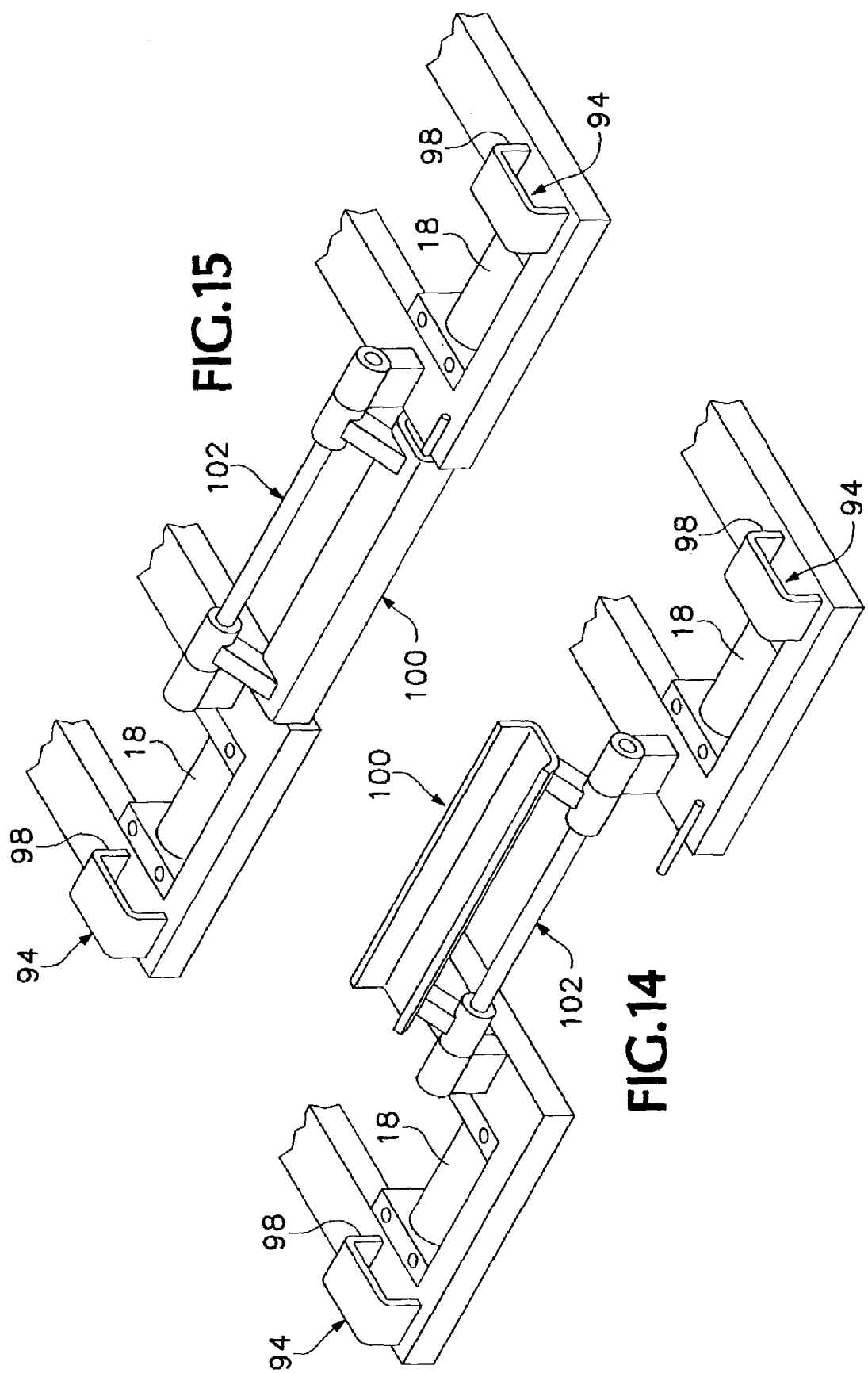

APPARATUS FOR TRANSFERRING CONTAINERS AND FLAT RACKS FROM A TRUCK TO A TRAILER

BACKGROUND AND SUMMARY OF THE INVENTION

This invention relates to an apparatus for loading cargo containers and flat racks off of the bed of a truck and onto a trailer using a hook lift system located on the truck.

Containers are used extensively to ship cargo by ship, rail and truck and a container can be transported on all three modes in a single trip. At large loading facilities the containers are loaded onto and off of the ships, railcars or trucks with large cranes. However, it often is desirable to load or unload a container from a truck at a smaller facility that does not have a crane. In order to accomplish this the trucks are equipped with a hook lift system that clamps to the front of the container. The hook lift system uses a series of levers and hydraulic cylinders to raise the front end of the container, which rotates the container about a rotary slide located at the rear of the truck that carries the container. The hook lift system then pushes the container rearwardly until its lower edge rests on the ground, as shown in FIG. 21. The weight of the container then causes the truck to roll forward until it is free of the container. The hook lift system then sets the front end of the container on the ground. The hook lift system loads the container from the ground onto a truck in essentially the reverse manner.

Flat racks are used to carry a load that is to be placed in a container when it is desired to remove the load from the container but not disassemble it. At times these flat racks are transported outside of the container and they can be loaded onto and off of a truck using the hook lift system on the truck.

The hook lift system is also used to load a container or flat rack onto a trailer. To accomplish this the container or flat rack is first loaded onto the truck and then unloaded from the truck onto the trailer. The problem with this is that unless the bed of the trailer is perfectly lined up longitudinally with the bed of the truck, the container or flat rack will not be centered on the trailer or will be cocked relative to the center line of the trailer. In addition, the rear end of the container or flat rack must be slid across the entire length of the trailer with metal to metal contact.

The subject invention provides an apparatus for using the hook lift system for unloading a container or flat rack from a truck and placing it on a trailer, and vice versa, without having to slide the lower rear edge of the container across the entire trailer bed. The apparatus also ensures that the container or flat rack is centered squarely on the trailer. A carriage, having a cradle which is configured to releasably receive a cross member located at the lower rear edge of a container, travels along the entire longitudinal extent of the trailer on a track system located on the trailer. The carriage also has a receptacle which releasably receives wheels which are located at the rear of some flat racks. A support stand located on the carriage releasably receives the rear edge of a flat rack that does not have wheels. In one preferred embodiment of the invention there are guides which center the container on the cradle as its rear end is being loaded onto the cradle. In another preferred embodiment there are releasable locks which secure the front and rear of the container to the trailer.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 3 is a plan view of a carriage which is a part of the subject invention.
FIG. 4 is a side elevation view of the carriage.
FIG. 5 is a detailed view showing a carriage return system which is a feature of the subject invention.
FIG. 6A is a sectional view taken on the line 6—6 of FIG. 7.
FIGS. 14 and 15 are perspective views showing alternative stands which are used for loading a flat rack onto the carriage.

DETAILED DESCRIPTION OF THE PREFERRED EMBODIMENT

Figure 1:
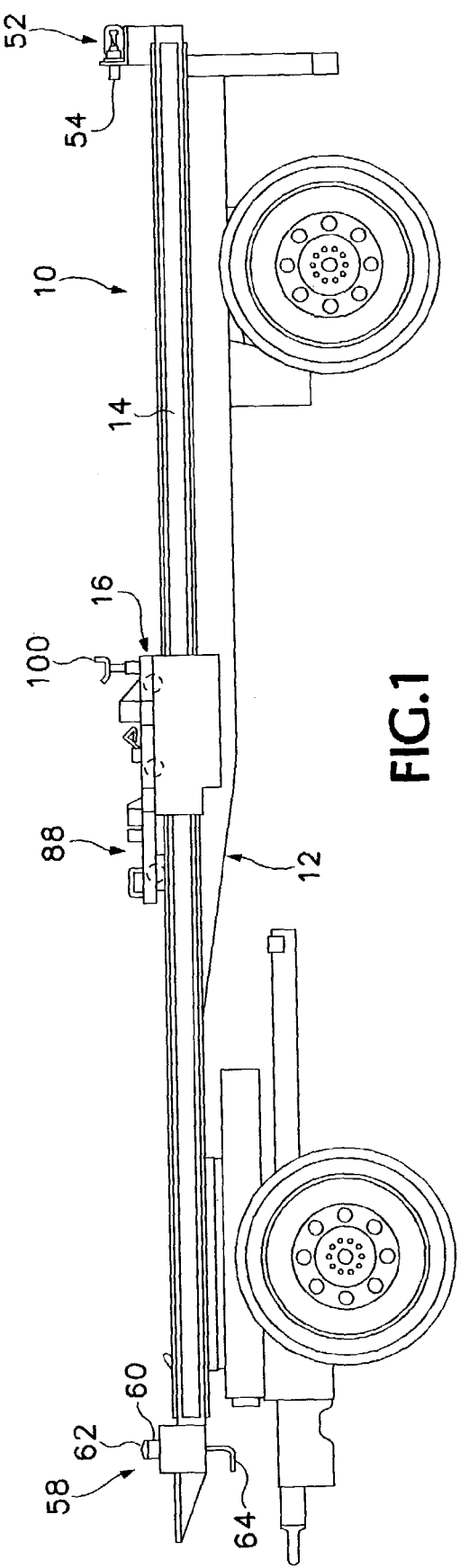
FIG. 1 is a side elevation view of a trailer
Figure 2:
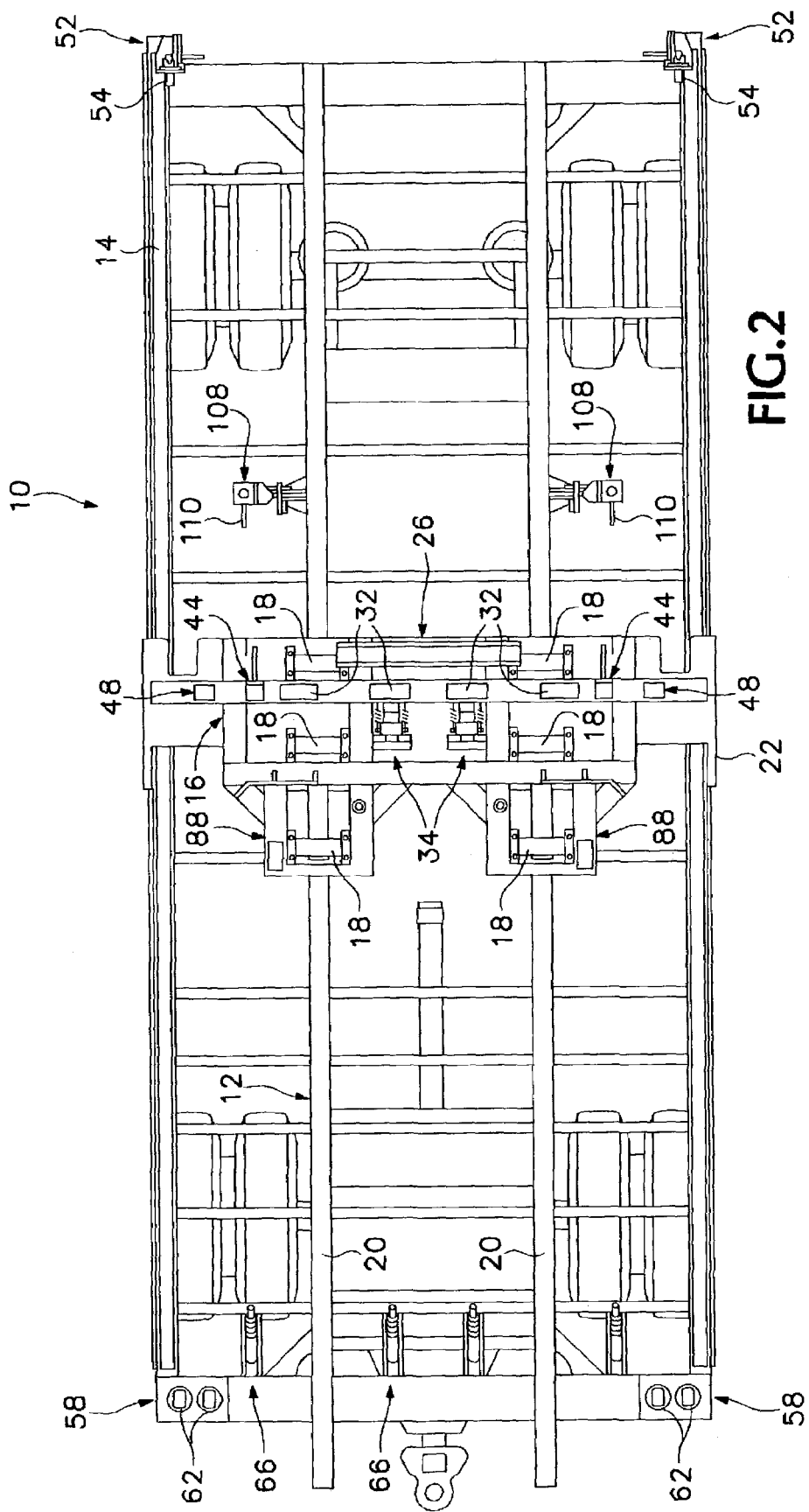
FIG. 2 is a plan view of the trailer of FIG. 1.
Figure 6:
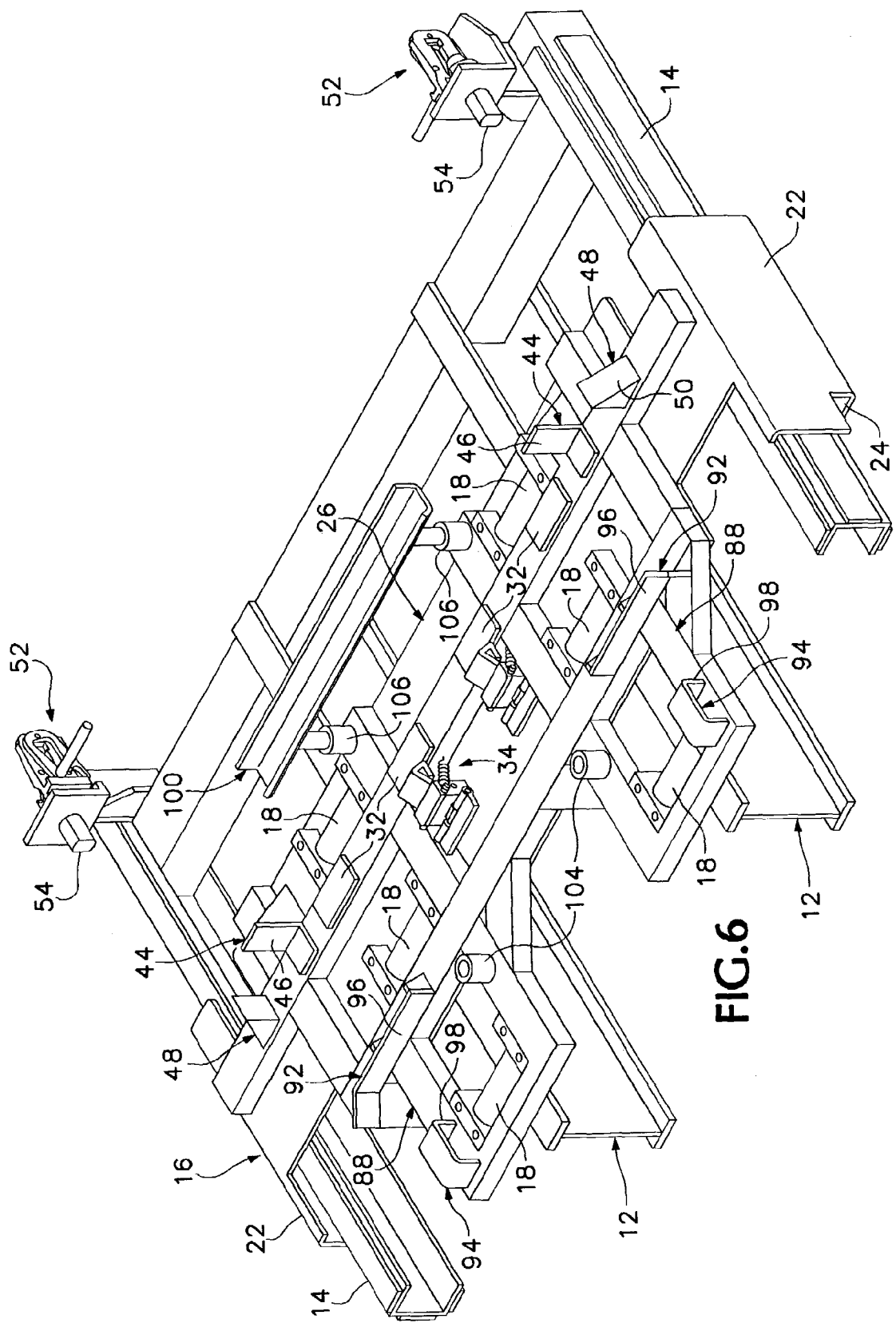
FIG. 6 is a perspective view of the carriage located on the trailer.
Figure 7:
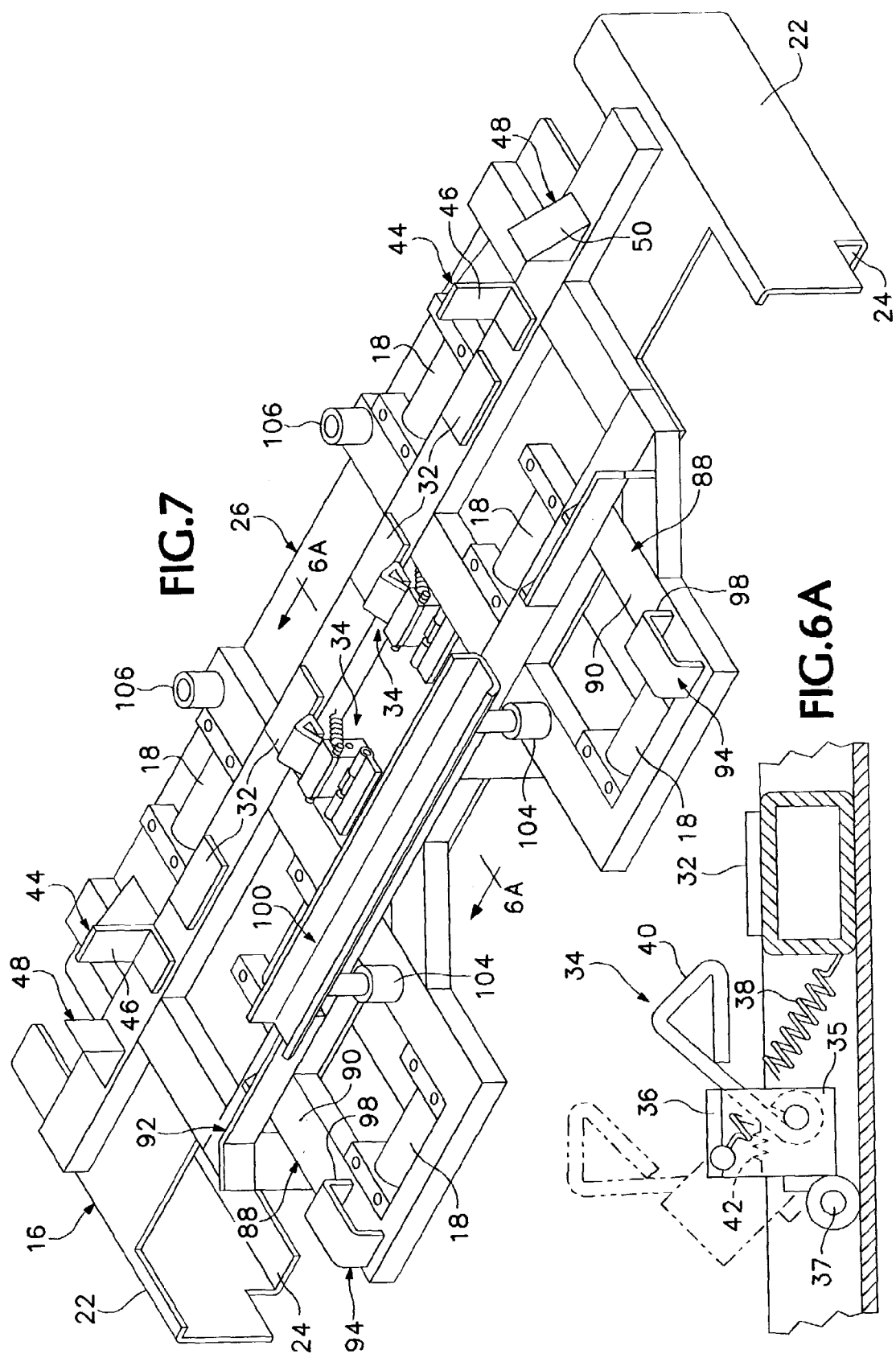
FIG. 7 is a perspective view of the carriage without the trailer.
Figure 8:
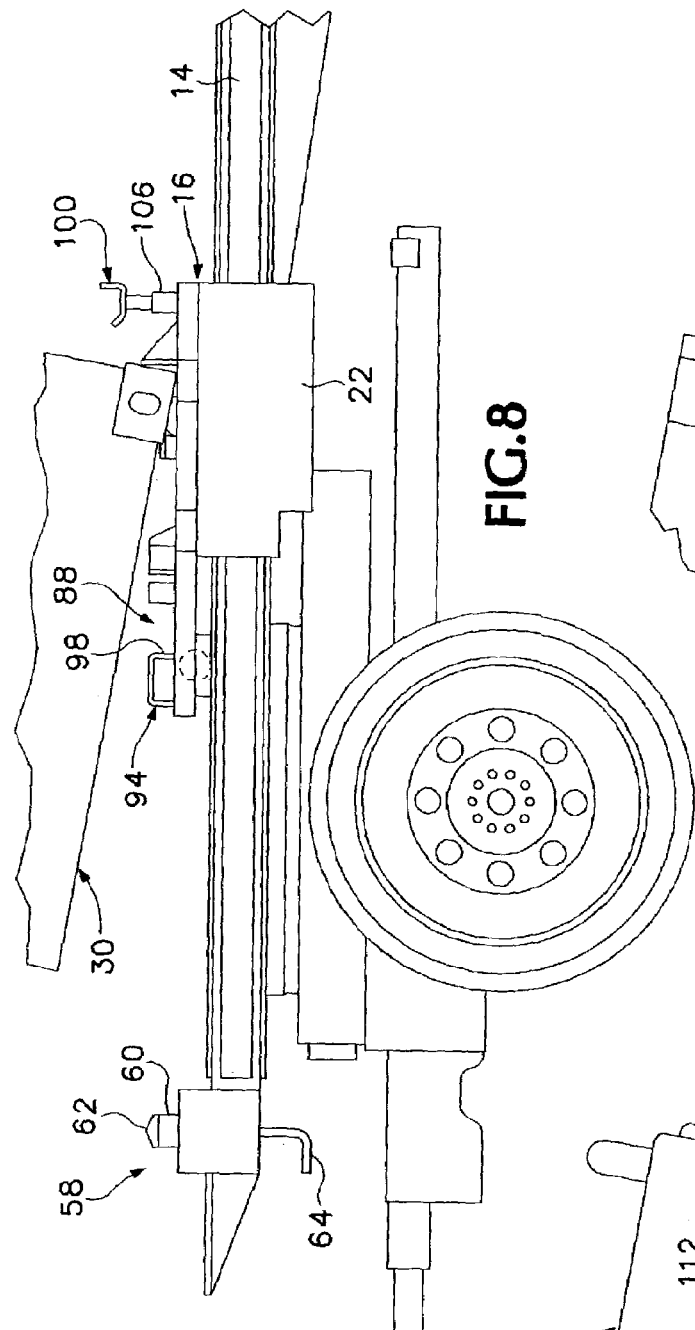
FIG. 8 is a detailed view showing a container being loaded onto the carriage.
Figure 10:
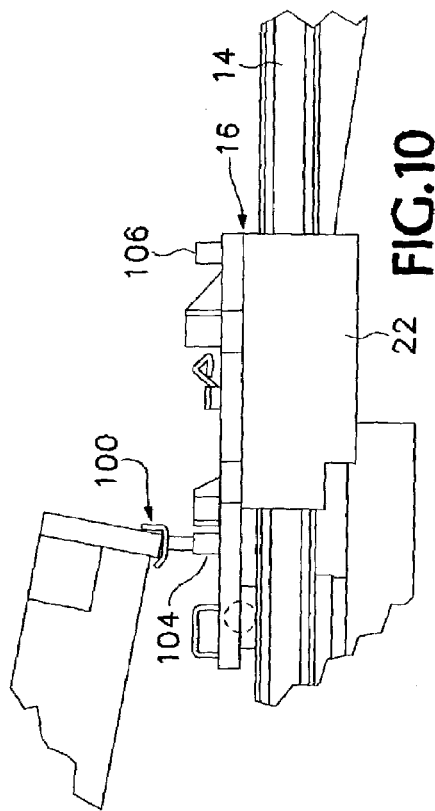
FIG. 10 is a detailed view showing another version of a flat rack being loaded onto the carriage.
Figure 12:
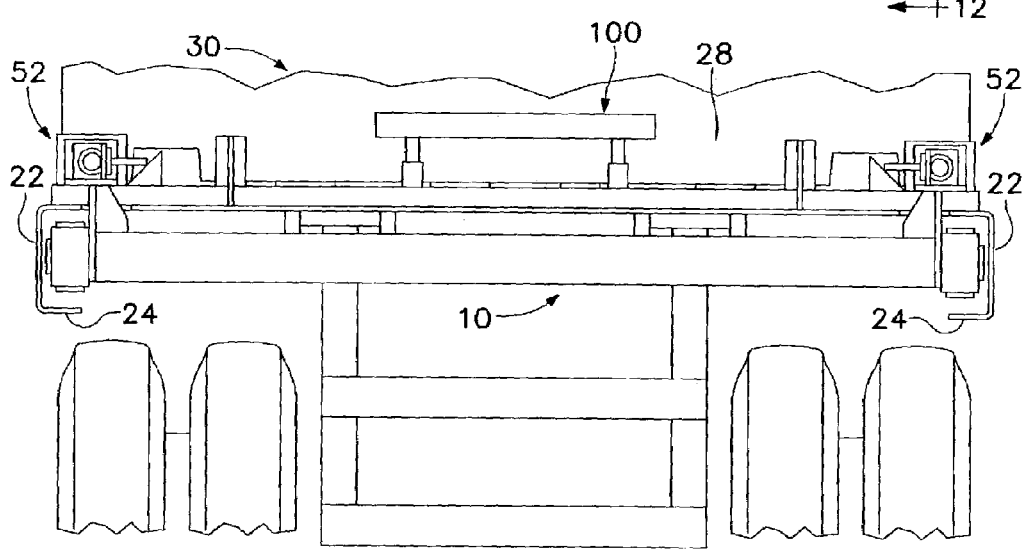
FIG. 12 is a rear elevation view showing a container fully loaded onto the trailer and locked in place.
Figure 20:
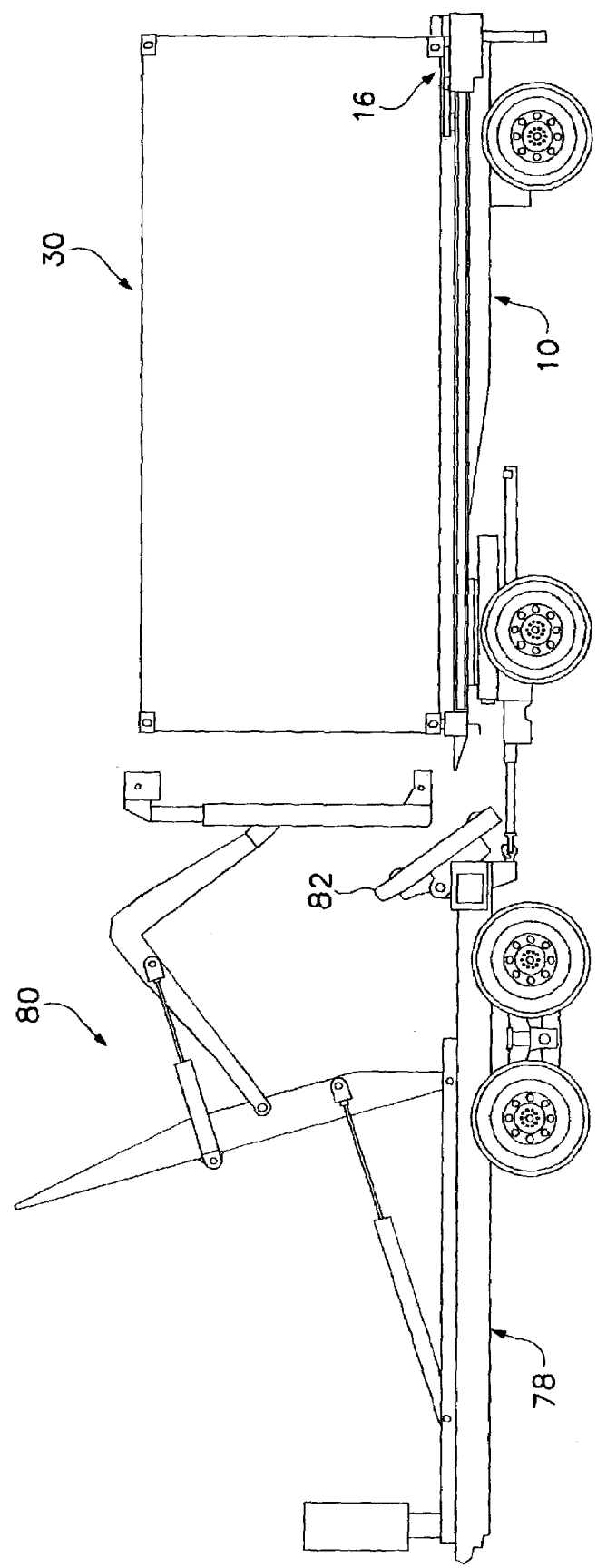
Figure 21:
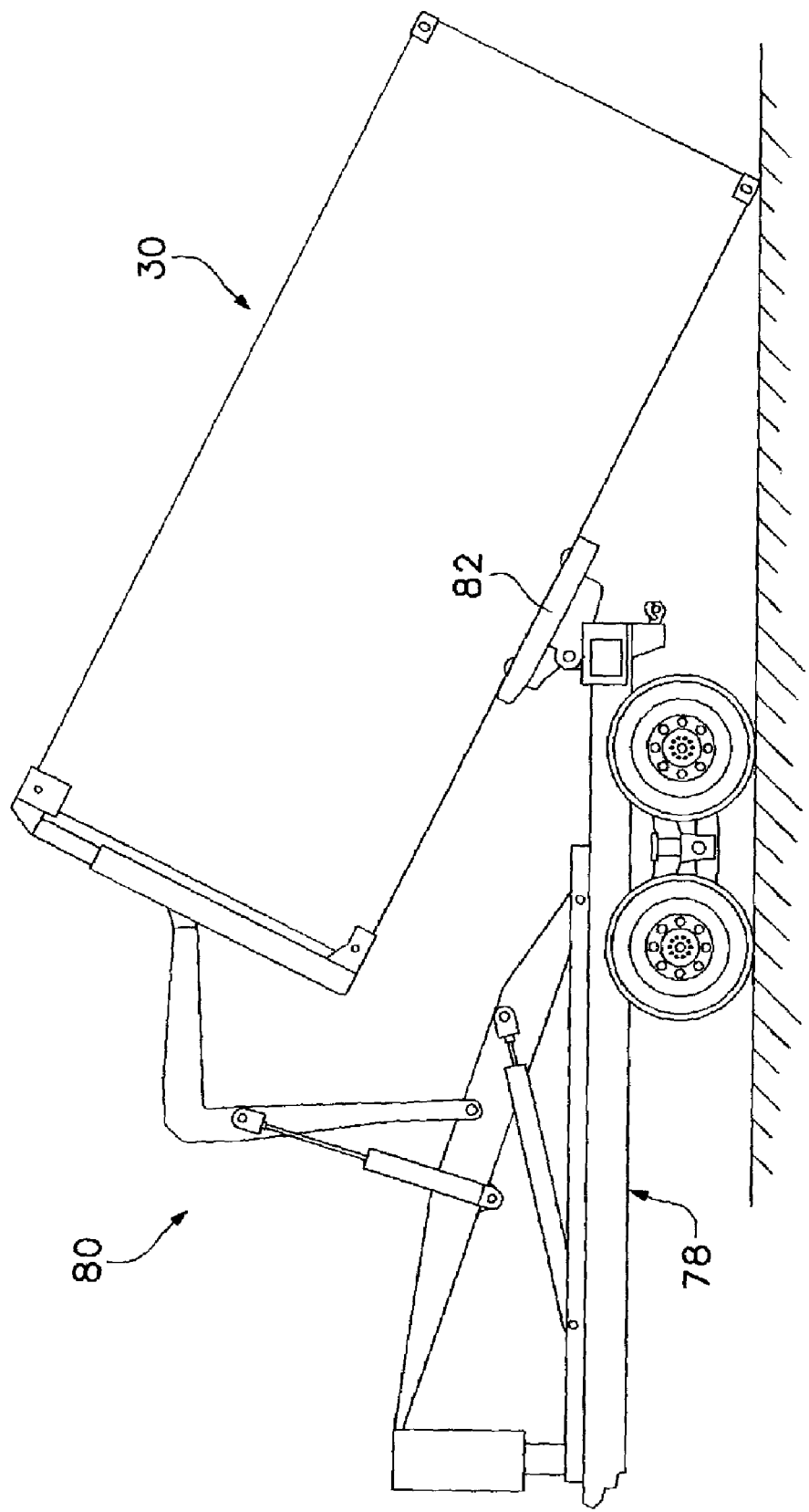
FIG. 21 is a side elevation view showing a container being loaded off of the truck onto the ground.

Referring now to FIGS. 1 and 2 of the drawings, a truck trailer 10 has two I-beams 12 which extend along its entire longitudinal extent. One beam 12 is located approximately midway between the longitudinal center line of the trailer and each side. Located at each side of the trailer is an inwardly facing C-shaped channel 14. This structure is typical of trailers of this type, but the I-beams 12 and C channels 14 may vary somewhat from those illustrated. Referring now also to FIGS. 3, 6 and 7, the beams 12 and channels 14 together act as a track system upon which a carriage 16 travels along the trailer between a receiving position at the front of the trailer, FIG. 18, and a loaded position at the rear of the trailer, FIG. 20. The carriage is supported by a plurality of rollers 18 which ride on the top flanges 20 of the beams 12. Located at each side of the carriage are guide plates 22 which extend downwardly along the sides of the channels 14. Inwardly extending tabs 24 at the front of the side plates engage the bottoms of the channels 14, FIG. 12. The guide plates and tabs keep the carriage centered transversely on the trailer and prevent cocking of the carriage as it moves.

A cradle 26 is located on the carriage 16. The cradle 26 is configured to receive the cross member 28, FIG. 12, which is located at the lower rear edge of a container 30. In the embodiment illustrated the cradle is a plurality of flat pads 32 which are located side-by-side transversely across the center portion of the carriage. Referring now also to FIG. 6A, located in front of the two center pads are return assist assemblies 34. Each return assist assembly includes a U-shaped support 35 which extends upwardly from the carriage. The support has a flat top plate 36. The support is rotatably attached to the carriage through a hinge 37 which allows the support to be rotated forwardly to a break-away position, shown in dashed lines in FIG. 6A. Springs 38 bias the support plate 35 toward its normal upright position, as shown in solid line in FIG. 6A.

Rotatably mounted in the support 35 is an arm 39. The arm 39 is movable between a raised position, shown in FIG. 6A, and a lowered position where the rear edge 40 of the arm contacts the front edge of the pad 32. The arm 39 has a contact surface 40 which slopes forwardly and upwardly from the pad. A spring 42 normally biases the arm 39 to its raised position. The return assist assembly facilitates inserting the container rear cross member 28 on the pads 32 and removing the container from the carriage even though the loading and unloading characteristics of the container differ depending on how heavily it is loaded, as will be more fully explained later.

Figure 22:
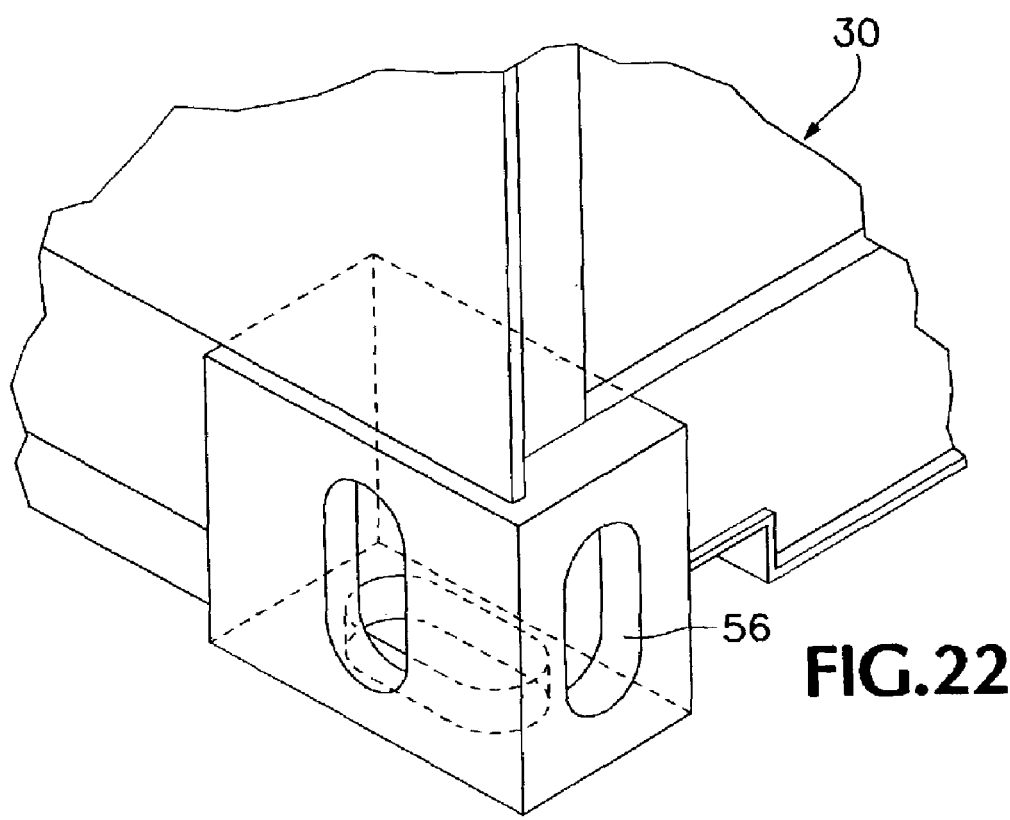
FIG. 22 is a fragmentary perspective view showing a locking hole at a lower rear corner of a container.
Figure 23:
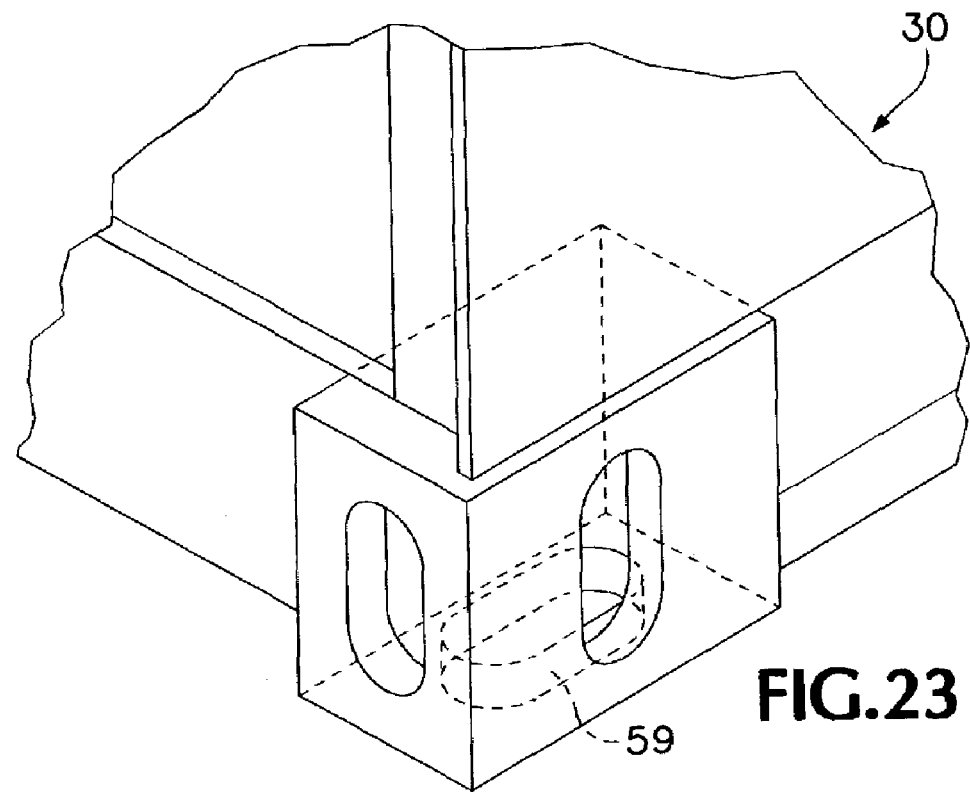
FIG. 23 is a fragmentary perspective view showing a locking hole at a lower front corner of a container.

The cradle also includes a pair of side positioning blocks 48 which are located on each side of the carriage outwardly of the outermost pads. The side positioning devices are separated from one another by a distance equal to the width of the container and have outwardly and downwardly sloping surfaces 50 which contact the inside surfaces of the longitudinal side frame members of the containers. Thus, the positioning devices center the rear edge of the container on the cradle. Located at the rear end of the trailer are a pair of rear locking devices 52. The rear locking devices have pins 54 which can be moved to either an extended position where they fit into openings 56, FIG. 22, located at the rear of the container or a retracted position where they are free of the container. The rear positioning devices prevent the container from moving from side to side or rearwardly once it is loaded on the trailer.

Located at the front end of the trailer are a pair of front locking devices 58 having upwardly projecting pins 60 which extend into two openings 59 located at the front end of the container when the container is fully loaded on the trailer. The pins 60 have rotating tips 62 which lock the container onto the pins. Handles 64 rotate the tips 62 between their locked and unlocked positions.

Referring now to FIGS. 2, 4 and 5, a plurality of carriage return mechanisms 66 are located at the front of the trailer to return the carriage completely to its receiving position when a container or flat rack is removed from it and to hold the carriage in its receiving position when the rear end of the container or flat rack is being loaded onto it. Each carriage return mechanism includes a socket 68 which is attached to the trailer frame and is rotatable about an axis 70. A pin 72 which fits into the socket can slide inwardly and outwardly and is biased outwardly by a spring 74. When the carriage is fully in its receiving position the socket is rotated forwardly to the position shown in solid line in FIG. 5, and the pin 72 fits into a U-shaped receptacle 76 mounted on the bottom of the carriage. The spring is compressed and holds the carriage in its receiving position. As the carriage moves rearwardly, the socket 68 is rotated about the axis 70 until it is in the position shown in dashed lines in FIG. 5 and the carriage pulls free from the carriage return mechanism. When the carriage is returned to its receiving position the receptacle engages the pin 72 as the carriage approaches and the spring 74 is compressed until the socket is rotated past vertical. The spring then urges the carriage forwardly to its receiving position.

Figure 18:
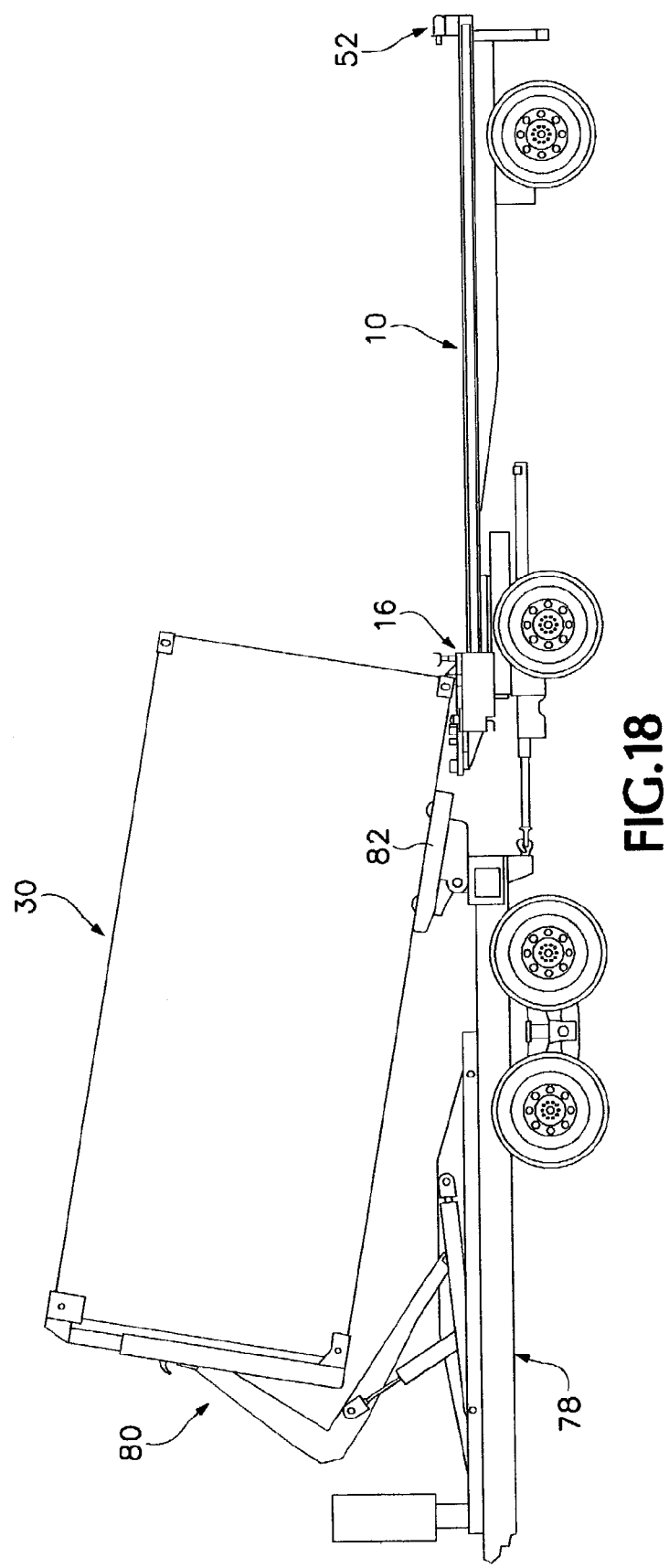
FIGS. 18–20 are side elevation views showing the sequence of a container being loaded off of a truck onto a trailer.
Figure 19:
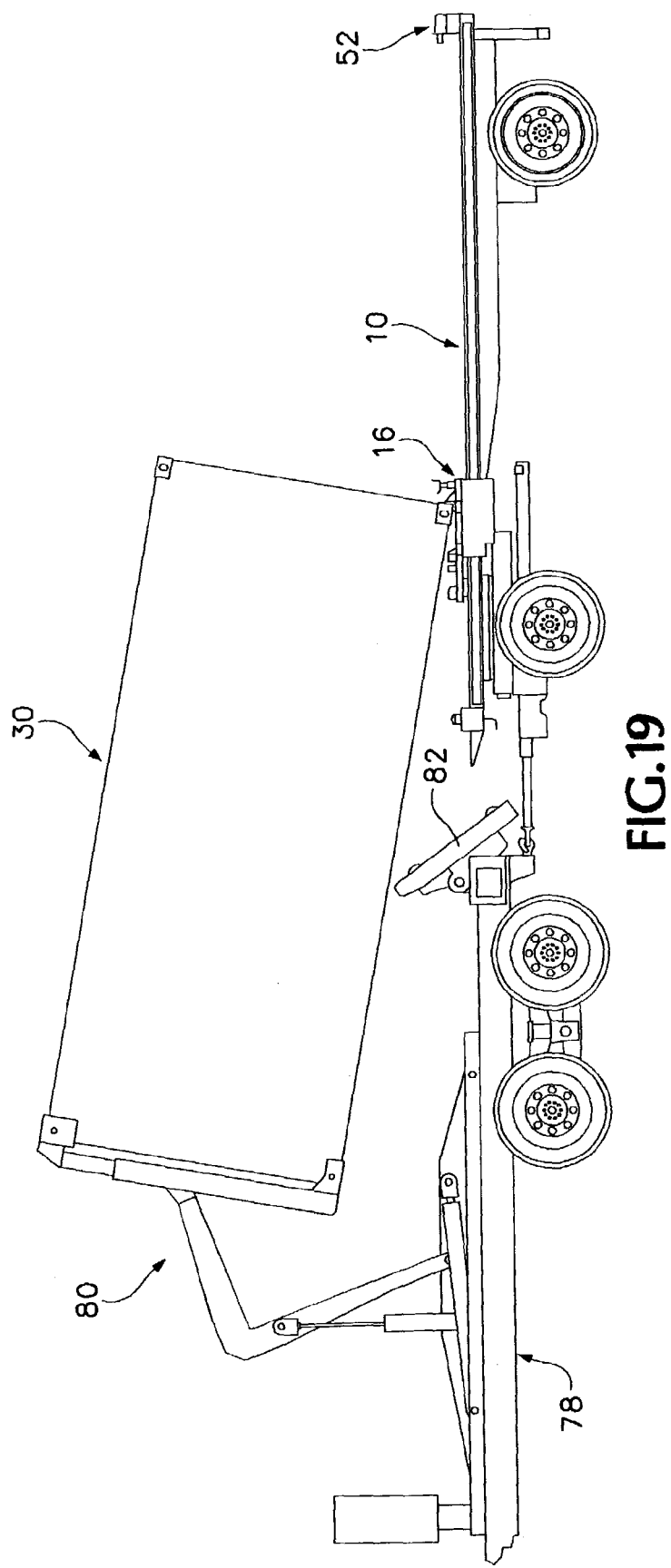

In operation a container 30 is unloaded from a truck 78 having a hook lift system 80 onto a trailer 10 by using the hook lift system to raise the front of the container and move the container rearwardly on the pivoting slide 82 located at the rear of the truck, FIG. 18. The carriage is configured such that as the lower rear edge of the container reaches the trailer, the container rear cross member 28 strikes the vertical legs 46 of the stops 44 which causes it to drop onto the pads 32. Before the container reaches the stops 44 it contacts the arms 39 of the return assist assemblies 34 and moves them to their lowered positions. The sloped contact surfaces 40 of the arms 39 help guide the container cross member onto the pads. As the rear end of the container drops into the carriage the sloped surfaces 50 of the side positioning blocks engage the inside of the container frame and center the container on the carriage. The carriage return mechanism 66 prevents the carriage from moving rearwardly on the trailer as this is occurring. Once the rear edge of the container has dropped into the carriage the carriage carries the container as it moves rearwardly on the trailer upon further extension of the hook lift system 80, FIG. 19. Since the carriage is supporting the rear edge of the container the container remains centered on the trailer and does not drag along the upper surface of the trailer as this occurs.

As the carriage moves rearwardly the sockets 68 of the carriage return mechanism 66 rotate to the dashed line position shown in FIG. 5 and the pins 72 pull out of the receptacle 76. When the container fully reaches the back of the trailer the hook lift system sets the front of the container onto the trailer and the front locking devices 58 fit into the holes at the front of the container. The hook lifting system is then disconnected from the container and retracted onto the truck, FIG. 20. The front and rear locking devices are then engaged to secure the container on the trailer.

A container is removed from the trailer and loaded onto the truck by reversing the foregoing procedure. If the container is lightly loaded its angle may be such that it wants to pull free of the cradle before the carriage has returned to where the carriage return mechanisms 66 are activated. In this event, the container rear cross member sliding up the sloped contact surfaces 40 of the arms 39 will ensure that the carriage is far enough forward to engage the carriage return mechanisms before the container is lifted off the carriage. The hinge 37 allows the support 35 to rotate forwardly and release the container if it remains on the contact surface once the carriage is at its forward most position. As the carriage approaches its unloading position the pins 72 of the carriage return mechanisms engage the receptacle 76, and further movement of the carriage causes the sockets to be rotated to their solid line position shown in FIG. 5, and the carriage return mechanism holds the carriage in the loaded position after the container is removed from it.

Figure 9:
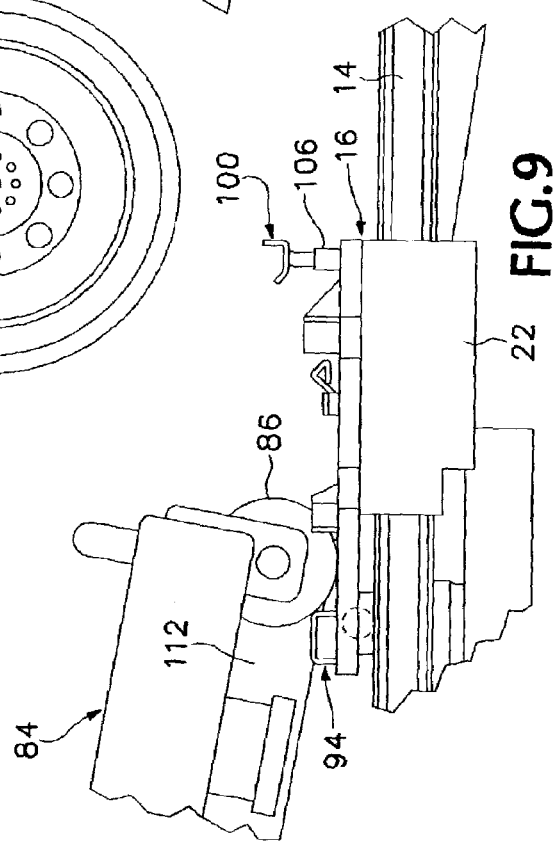
FIG. 9 is a detailed view showing a flat rack being loaded onto the carriage.
Figure 11:
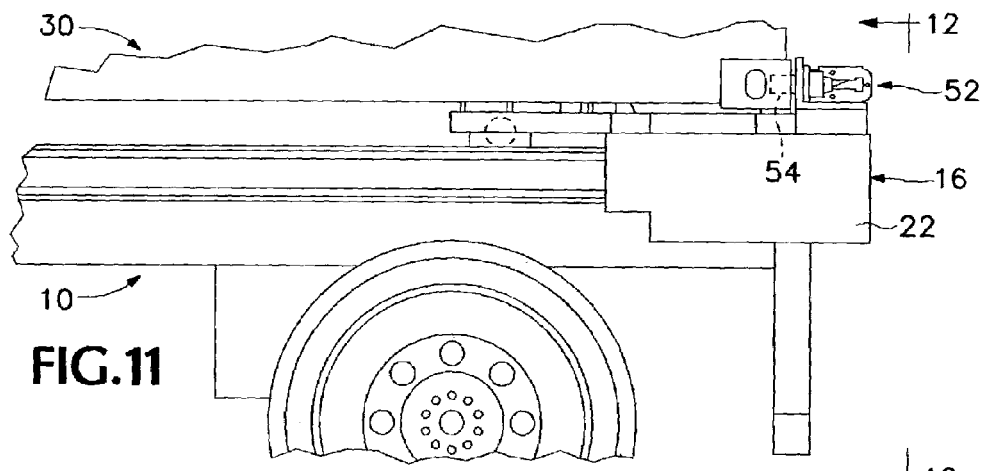
FIG. 11 is a side elevation view showing a container fully loaded onto the trailer and locked in place.

A flat rack 84 is loaded onto the trailer 10 in much the same manner as the container 30. If the flat rack has wheels 86 at its rear end they fit into a pair of receptacles 88 located on the carriage 16, FIG. 9. Each receptacle 88 includes a pad 90 which supports the wheel 86, a rear stop 92, which contacts the rear side of the wheel, and a front stop 94, which contacts the front side of the wheel. The rear stop has a vertical face 96 and the front stop has a vertical face 98.

If the flat rack does not have wheels a fixture 100 needs to be provided to receive and support the rear edge of the flat rack when it is loaded on the carriage. The fixture has the same shape as the channel segments 32 except that it is longer. In a first embodiment shown in FIGS. 14 and 15 the fixture 100 is rotatably carried on mounts 102 located at the front of the carriage. This allows the fixture to be placed in either a raised position, FIG. 14, where it supports the flat rack, or a lowered position, FIG. 15, where it does not interfere with containers and flat racks having wheels. In another embodiment, shown in FIGS. 6 and 7, the fixture 100 fits into bosses 104 located at the front of the carriage when in use, and in bosses 106 located at the rear of the carriage when not in use.

Figure 13:
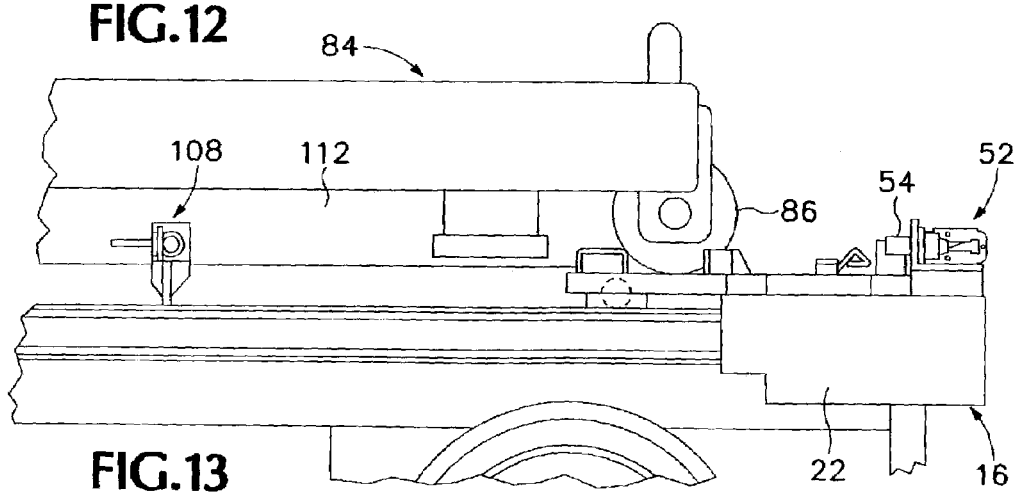
FIG. 13 is a side elevation view showing a flat rack fully loaded onto the trailer and locked in place.
Figure 16:
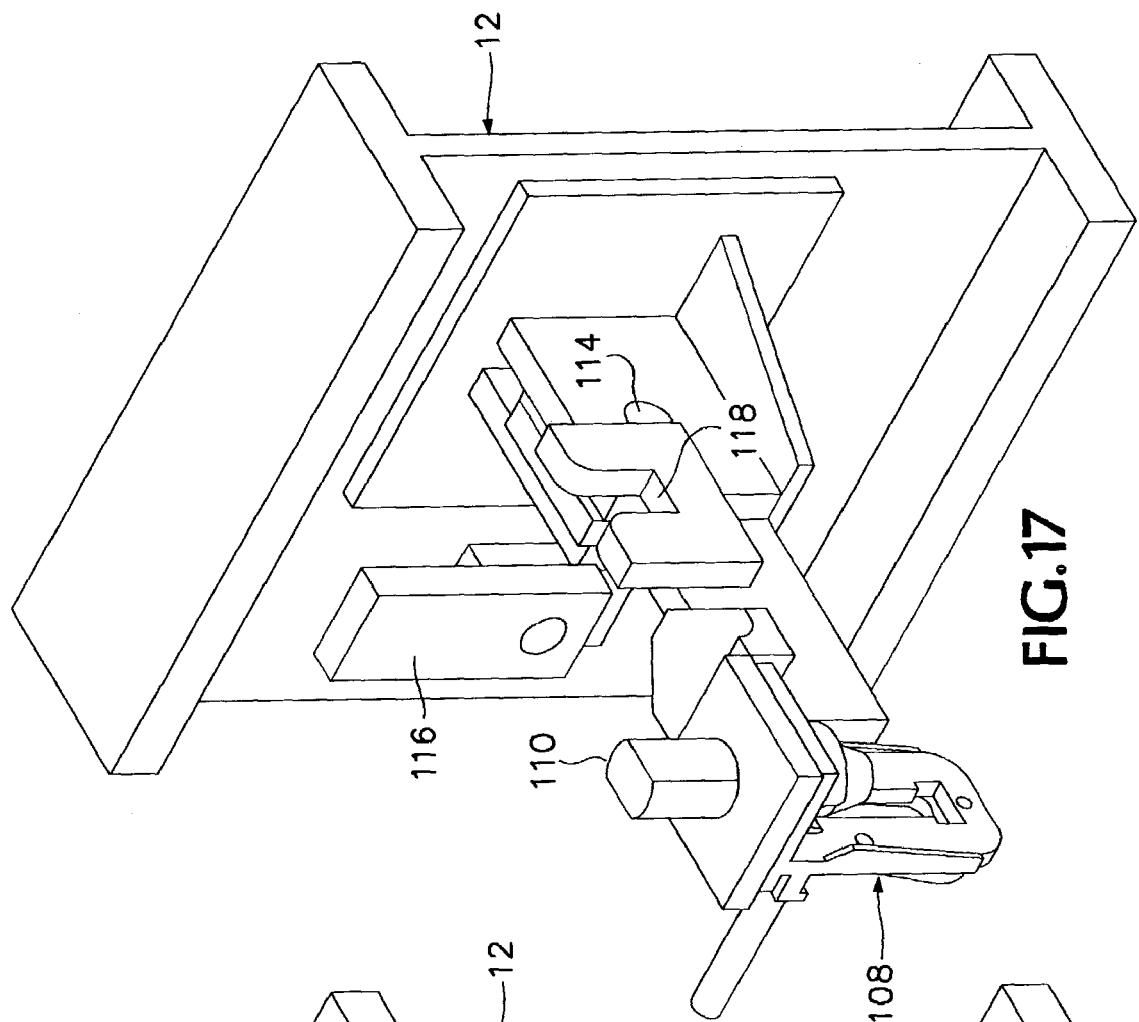
FIG. 16 is a perspective view showing a mechanism for locking a flat rack on the trailer.
Figure 17:
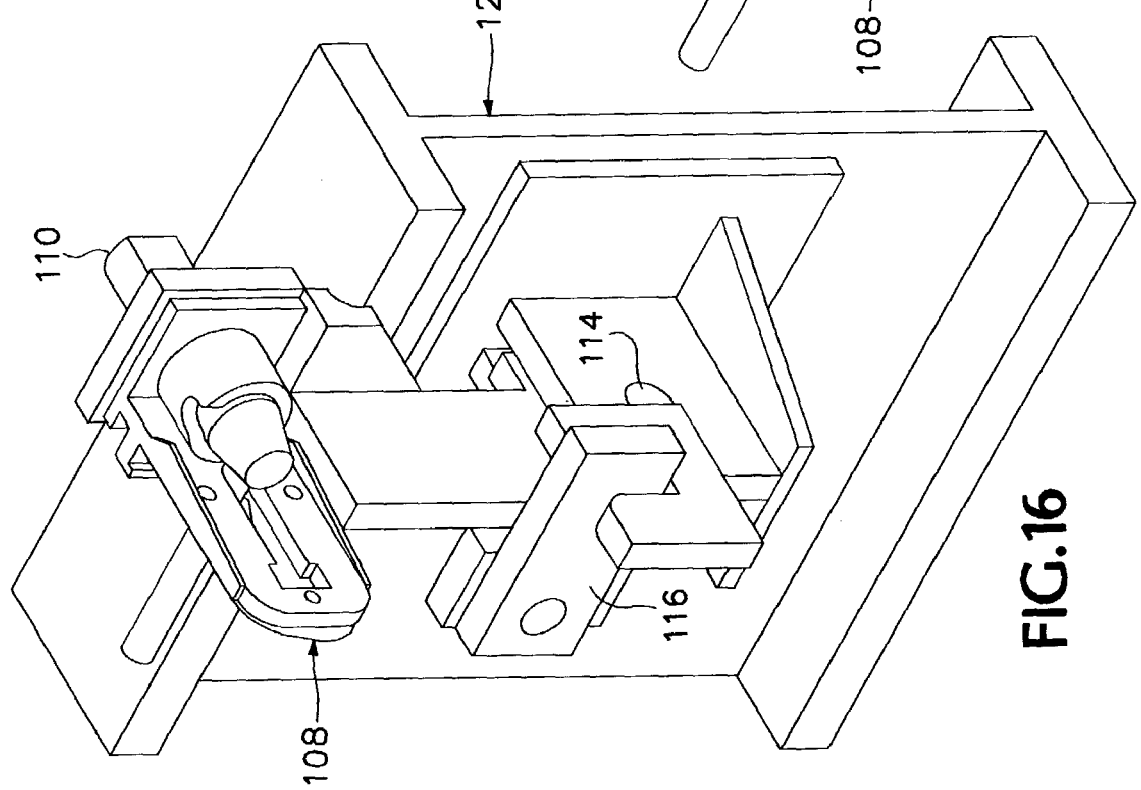
FIG. 17 is a perspective view showing mechanism of FIG. 16 pivoted to allow the flat rack to be removed from the trailer.

Referring now to FIGS. 13, 16 and 17 the flat racks are locked on the trailer using locks 108. The locks 108 are similar to the rear locking devices 52 and have pins 110 which fit into holes (not shown) located in a frame element 112 of the flat rack 84. The locks 108 are mounted on the beams 12 of the trailer. The locks 108 pivot on a hinge 114 between a raised position, FIG. 16, where the pins 110 fit into the holes in the flat rack frame, and a lowered position, FIG. 17, where the locks are located below the beam 12 and will not interfere with the carriage 16. Bars 116 fit into a slot 118 to hold the locks 108 in their raised position.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. An apparatus for loading cargo containers and flat racks off of a truck having a hook lift system onto a trailer, and from the trailer back onto the truck, comprising:
   (a) a track system extending longitudinally along said trailer;
   (b) a carriage that is moveable along said track system between a receiving position at a front end of said trailer and a loaded position at a rear end of said trailer;
   (c) a cradle located on said carriage which is configured to releasably receive a cross member located at a lower rear edge of said container, so that when said container is unloaded from said truck with said hook lift system said cross member is placed into said cradle and said carriage then carries said container along said truck as said hook lift system continues to unload said container;
   (d) wherein said cradle comprises at least one support pad and at least one rear stop having a vertical leg which is located rearwardly of said support pad.

2. The apparatus of claim 1 wherein said track system comprises longitudinal beams located on said trailer and said carriage includes rollers which ride on said beams and support said carriage.

3. The apparatus of claim 2 wherein said track system further comprises channels located along the edges of said trailer and said carriage includes guide plates which overlie said channels.

4. The apparatus of claim 1 wherein said cradle further comprises at least one positioning device having a sloped surface which centers said container laterally on said carriage.

5. The apparatus of claim 4 wherein there are two of said positioning devices, one on each side of said carriage, and the sloped surfaces of said positioning devices face outwardly toward said trailer in opposite directions.

6. The apparatus of claim 1, including at least one rear locking device which fits into an opening located at the rear end of said container and holds said container on said trailer.

7. The apparatus of claim 6 wherein said rear locking device includes a pin which can be withdrawn from said container so that said container can be lifted upwardly off of said trailer.

8. The apparatus of claim 1, including at least one front locking device which fits into an opening located at the front end of said container and locks the front end of said container onto said trailer.

9. An apparatus for loading cargo containers and flat racks off of a truck having a hook lift system onto a trailer, and from the trailer back onto the truck, comprising:
   (a) a track system extending longitudinally along said trailer;
   (b) a carriage that is moveable along said track system between a receiving position at a front end of said trailer and a loaded position and a rear end of said trailer;
   (c) a cradle located on said carriage which is configured to releasably receive a cross member located at a lower edge of said container; so that when said container in unloaded from said truck with said hook lift system said cross member is placed into said cradle and said carriage then carries said container along said truck as said lift hook system continues to unload said container;
   (d) wherein said cradle comprises at least one support pad and at least one return assist assembly which is located forwardly of said pad, said return assist assembly comprising:
      (i) a support which extends upwardly from said cradle;
      (ii) an arm which is rotatably mounted in said support and is movable between raised and lowered positions; and
      (iii) said arm having a contact surface which slopes upwardly and forwardly from said pad.

10. The apparatus of claim 9 wherein said arm is normally biased toward its raised position.

11. The apparatus of claim 9 wherein said return assist assembly further includes said support being rotatably attached to said carriage for movement between a normal upright position and a forwardly break-away position.

12. The apparatus of claim 11 wherein said arm is biased to its upright position.

13. An apparatus for loading cargo containers and flat racks off of a truck having a hook lift system onto a trailer, and from the trailer back onto the truck, comprising:
   (a) a track system extending longitudinally along said trailer;
   (b) a carriage that is moveable along said track system between a receiving position at a front end of said trailer and a loaded position at a rear end of said trailer;
   (c) a cradle located on said carriage which is configured to releaseably receive a cross member located at a lower rear edge of said container, so that when said container is unloaded from said truck with said hook lift system said cross member is placed into said cradle and said carriage then carries said container along said truck as said hook lift system continues to unload said container;

(d) including at least one carriage return mechanism which engages said carriage as it approaches its receiving position and biases said carriage toward said receiving position.

14. The apparatus of claim 13 wherein said carriage return mechanism comprises:

(a) a socket which is rotatably attached to said trailer;
(b) a receptacle which is attached to said carriage;
(c) a pin which fits within said socket and is slidable inwardly and outwardly therein; and
(d) said pin is normally biased outwardly to a position where it engages said receptacle between when said carriage approaches said receiving position and when it is filly in said receiving position.

15. An apparatus for loading flat racks off of a truck having a hook lift system onto a trailer, and from the trailer back onto a truck, comprising:

(a) a track system extending longitudinally along said trailer;
(b) a carriage that is moveable along said track system between a receiving position at a front end of said trailer and a loaded position at a rear end of said trailer;
(c) a cradle located on said carriage which is configured to releaseably receive a cross member located at a lower edge of said container, so that when said container is unloaded from said truck with said hook lift system said cross member is placed into said cradle and said carriage then carries said container along said truck as said lift system continues to unload said container; and
(d) receptacle located on said carriage which is configured to releasably receive wheels which are located at the rear of a flat rack so that when said flat rack is unloaded from said truck with said hook lift system said wheels are placed in said receptacles and said carriage carries said flat rack along said track as said hook lift system continues to unload said flat rack.

16. An apparatus for loading flat racks off of a truck having a hook lift system onto a trailer and from the trailer back onto the truck, comprising:

(a) a track system extending longitudinally along said trailer;
(b) a carriage that is moveable along said track system between a receiving position at the front end of said trailer and a loaded position at a rear end of said trailer;
(c) a receptacle located on said carriage which is configured to releasably receive wheels which are located at the rear of a flat rack so that when said flat rack is unloaded from said truck with said hook lift system said wheels are placed in said receptacles and said carriage carries said flat rack as said hook lift system continues to unload said containers.

17. The apparatus of claim 16 wherein said receptacle comprises:

(a) a pair of pads which are configured to support said wheels;
(b) a pair of rear stops which contact one side of said wheels; and
(c) a pair of front stops which contact the other side of said wheels.

18. An apparatus for loading flat racks off of a truck having a hook lift system onto a trailer, and from the trailer back onto the truck, comprising:

(a) a track system extending longitudinally along said trailer;
(b) a carriage that is moveable along said track system between a receiving position at a front end of said trailer and a loaded position at a rear end of said trailer;
(c) a cradle located on said carriage which is configured to releasably receive a cross member located at a lower edge of said container, so that when said container is unloaded from said truck with said hook lift system said cross member is placed into said cradle and said carriage then carries said container along said truck as said hook lift system continues to unload said container;
(d) a fixture located on said carriage which is configured to releasably receive a lower rear edge of said flat rack so that when said flat rack is unloaded from said truck with said hook lift system said lower rear edge of said flat rack is placed in said fixture and said carriage carries and said flat rack along said truck as said hook lift system continues to unload said flat rack.

19. The apparatus of claim 18, including a mount which is located on said carriage and carries said fixture, said mount being rotatable between a raised position where said fixture can receive said flat rack and a lowered position where said fixture is below an upper surface of said carriage.

20. The apparatus of claim 18, including:

(a) at least one leg which supports said fixture;
(b) a front boss located on said carriage forwardly of said cradle which receives said leg and positions said fixture in a position where it receives said flat rack; and
(c) a rear boss located on said carriage rearwardly of said cradle which receives said leg when said fixture is not in use.

* * * * *

UNITED STATES PATENT AND TRADEMARK OFFICE
CERTIFICATE OF CORRECTION

| | | |
|---|---|---|
| PATENT NO. | : 6,962,473 B2 | Page 1 of 1 |
| APPLICATION NO. | : 10/360606 | |
| DATED | : November 8, 2005 | |
| INVENTOR(S) | : Scranton, Tom L. | |

It is certified that error appears in the above-identified patent and that said Letters Patent are hereby corrected as shown below:

Column 2, line 7, is missing: ...including the apparatus of the subject invention. After <u>trailer</u>...

Column 7, line 17  "filly" should be "fully"

Column 7, line 34  missing "a" after (d)

Column 8, line 31  rear edge of "said" should be rear edge of "a"

Column 8, line 34  and said carriage carries <u>and</u>. There should be no "and"

Signed and Sealed this

Eighteenth Day of July, 2006

JON W. DUDAS
*Director of the United States Patent and Trademark Office*